(12) United States Patent
Goto et al.

(10) Patent No.: US 9,317,058 B2
(45) Date of Patent: Apr. 19, 2016

(54) PEDAL ASSEMBLY MODULE

(71) Applicant: Yanmar Co., Ltd., Osaka-shi, Osaka (JP)

(72) Inventors: Takashi Goto, Osaka (JP); Masahiro Hanafusa, Osaka (JP); Keisuke Iida, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/319,959

(22) Filed: Jun. 30, 2014

(65) Prior Publication Data

US 2015/0107394 A1   Apr. 23, 2015

Related U.S. Application Data

(60) Provisional application No. 61/892,582, filed on Oct. 18, 2013.

(51) Int. Cl.
| | |
|---|---|
| *G05G 1/36* | (2008.04) |
| *G05G 13/00* | (2006.01) |
| *B60T 7/06* | (2006.01) |
| *G05G 1/30* | (2008.04) |
| *B60K 23/00* | (2006.01) |

(52) U.S. Cl.
CPC . *G05G 13/00* (2013.01); *B60T 7/06* (2013.01); *G05G 1/36* (2013.01); *B60K 2023/005* (2013.01); *B60Y 2200/221* (2013.01); *G05G 1/305* (2013.01); *Y10T 74/20207* (2015.01)

(58) Field of Classification Search
CPC ........... F16H 2059/0234; F16H 59/06; B62M 25/06; B60K 41/04; B60K 2741/04; B60K 41/24; B60K 2741/24; B60K 23/02; B60K 2023/00; B60K 23/025; G05G 13/00; G05G 1/36; G05G 1/305; B60W 30/18; B60W 30/186; B60T 7/00; B60T 7/06
USPC ......... 74/473.16, 473.17, 478, 481, 482, 512; 180/53.2, 325, 336, 338
See application file for complete search history.

(56) References Cited

U.S. PATENT DOCUMENTS

| | | | | |
|---|---|---|---|---|
| 3,954,146 | A | * | 5/1976 | Smemo .......................... 180/336 |
| 4,106,362 | A | * | 8/1978 | Hildebrecht ................ 74/473.17 |
| 4,129,047 | A | | 12/1978 | Dornan |
| 5,022,477 | A | * | 6/1991 | Wanie ............................ 180/6.34 |
| 5,048,638 | A | * | 9/1991 | Duncan et al. ................. 180/307 |

(Continued)

FOREIGN PATENT DOCUMENTS

| | | |
|---|---|---|
| EP | 2537722 A2 | 12/2012 |
| FR | 2395857 A1 | 1/1979 |

(Continued)

OTHER PUBLICATIONS

Extended European Search Report for Application No. 14188636.6-1756, Applicant: Yanmar Co., Ltd., mailed Feb. 18, 2015.

*Primary Examiner* — William Kelleher
*Assistant Examiner* — Jude Agendia
(74) *Attorney, Agent, or Firm* — Sterne, Kessler, Goldstein & Fox P.L.L.C.

(57) ABSTRACT

For proving a pedal assembly module to improve productivity, a forward pedal, a backward pedal, a first shaft supporting the forward pedal and the backward pedal, a brake pedal, a second shaft supporting the brake pedal, and a frame box supporting the first shaft and the second shaft are assembled and integrated with their functions ensured.

3 Claims, 8 Drawing Sheets

(56) References Cited

U.S. PATENT DOCUMENTS

Figure 1:
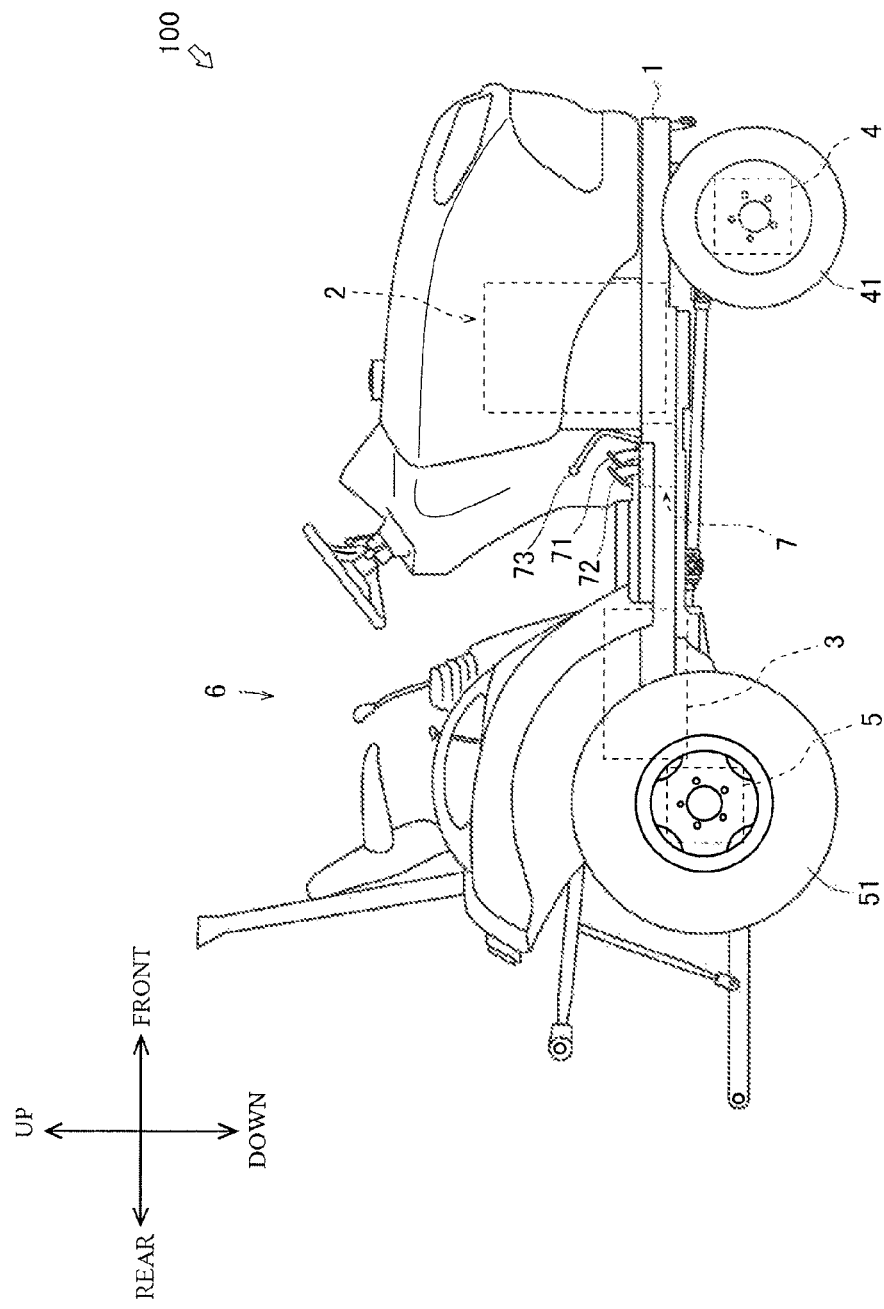

| | | | |
|---|---|---|---|
| 5,216,935 A * | 6/1993 | Shimamura et al. | 74/512 |
| 5,263,385 A * | 11/1993 | Hirata et al. | 74/481 |
| 6,886,677 B2 * | 5/2005 | Rupiper et al. | 192/219.6 |
| 8,763,749 B2 * | 7/2014 | Sahebrao et al. | 180/336 |
| 2005/0023049 A1 * | 2/2005 | Ferree et al. | 180/6.3 |

FOREIGN PATENT DOCUMENTS

| | | |
|---|---|---|
| GB | 2309287 A | 7/1997 |
| JP | 2011-141016 A | 7/2011 |
| JP | 2013-052771 A | 3/2013 |
| WO | WO2012/104871 A | 8/2012 |

\* cited by examiner

PEDAL ASSEMBLY MODULE

CROSS-REFERENCE TO RELATED APPLICATIONS

This application claims the benefit of U.S. Provisional Application No. 61/892,582, filed on Oct. 18, 2013, which is incorporated by reference in its entirety.

BACKGROUND OF THE INVENTION

1. Field of the Invention
This invention relates pedal a pedal assembly module.
2. Background Art
Conventionally, tractors used for such as towing the working machine are known (See JP 2013-52771 A). The tractor is equipped with a driver's seat and an operator operates on the seat. The tractor as described above is referred to as a riding type tractor.
By the way, there are tractors equipped with a reverse pedal and the forward pedal (for example, refer to JP 2011-141016 A). Such a tractor has at least three pedals disposed on the floor in conjunction with the brake pedal. Thus, the steps of attaching a variety of pedals are required, and there is a problem the process is complicated further. Therefore, the pedal assembly module which improves productivity has been desired.

BRIEF SUMMARY OF THE INVENTION

Embodiments disclosed herein provide a pedal assembly module to improve the productivity.
In one embodiment,
a pedal assembly module is disclosed, comprising: a forward pedal, a backward pedal, a first shaft supporting the forward pedal and the backward pedal, a brake pedal, a second shaft supporting the brake pedal, and a frame box supporting the first shaft and the second shaft, wherein the forward pedal, the backward pedal, and the brake pedal are assembled and integrated with their functions ensured.
In one embodiment, the forward and the backward pedals are supported with the first shaft inserted in their each sleeve.
In one embodiment, the pedal assembly module farther comprises:
a link plate rotates along with the rotation of the forward or the backward pedal, wherein the brake pedal and the link plate are supported with tie second shaft inserted in their each sleeve.
In one embodiment, the link plate forms a mechanism of pushing out the backward pedal when the forward pedal is depressed and of pushing out the forward pedal when the backward pedal is depressed.
In one embodiment, the pedal assembly module further comprises: a ratchet plate stopping the brake pedal, and a link rod able to rotate the ratchet plate, wherein the ratchet plate and the link rod are supported by the frame box.

Advantageous Effects

In one embodiment, the pedal assembly module is made by integrating and assembling the forward pedal, the backward pedal and the brake pedal with their functions ensured. This reduces some processes for installing various pedals, achieves just installing the pedal assembly and increases the productivity.
In one embodiment, the forward pedal and the back ward pedal are supported with inserting the first shaft to each sleeve. This makes simple in the structure for supporting the forward pedal and the backward pedal and achieves the cost reduction.
In one embodiment, the brake pedal and the link plate are supported with inserting the second shaft to each sleeve. This makes simple in the structure for supporting the brake pedal and the link plate and achieves the cost reduction.
In one embodiment, the link plate forms a mechanism of pushing out the backward pedal when the forward pedal is depressed and of pushing out the forward pedal when the backward pedal is depressed. This makes the forward pedal and the backward pedal to work together, reduces a clutch and achieves the cost reduction.
In one embodiment, the ratchet plate and the link rod are supported by the frame box. This reduces some processes for installing and further increases the productivity.

BRIEF DESCRIPTION OF THE DRAWINGS/FIGURES

Figure 2:
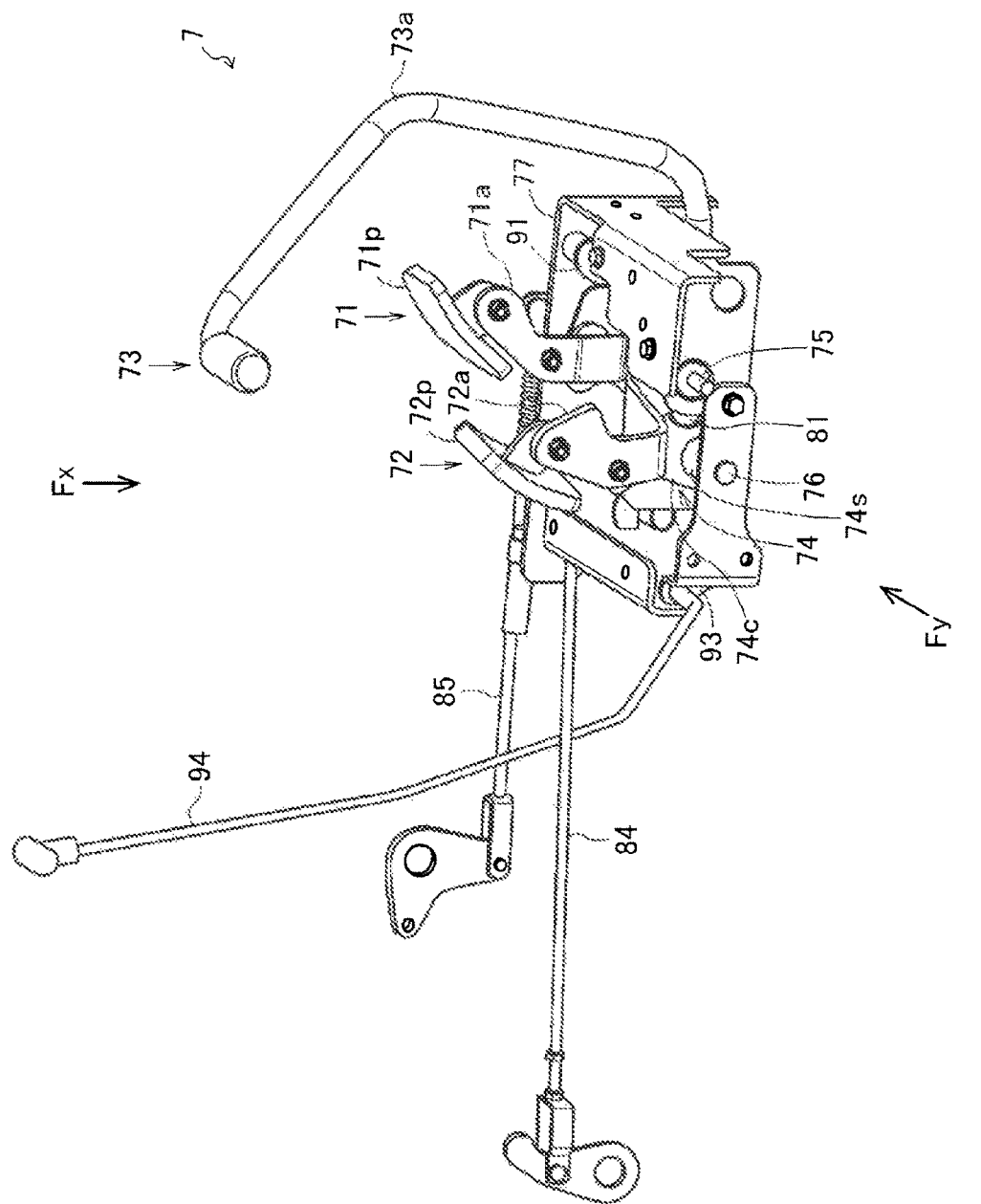
Figure 3:
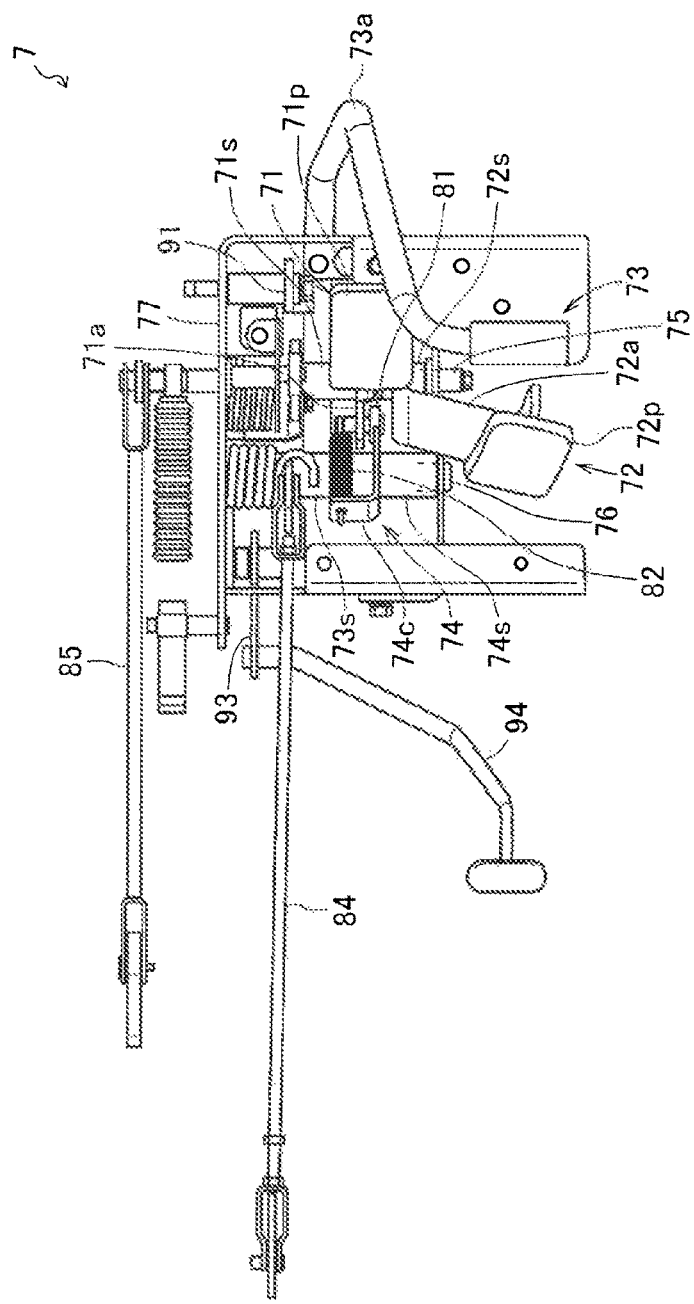
Figure 4:
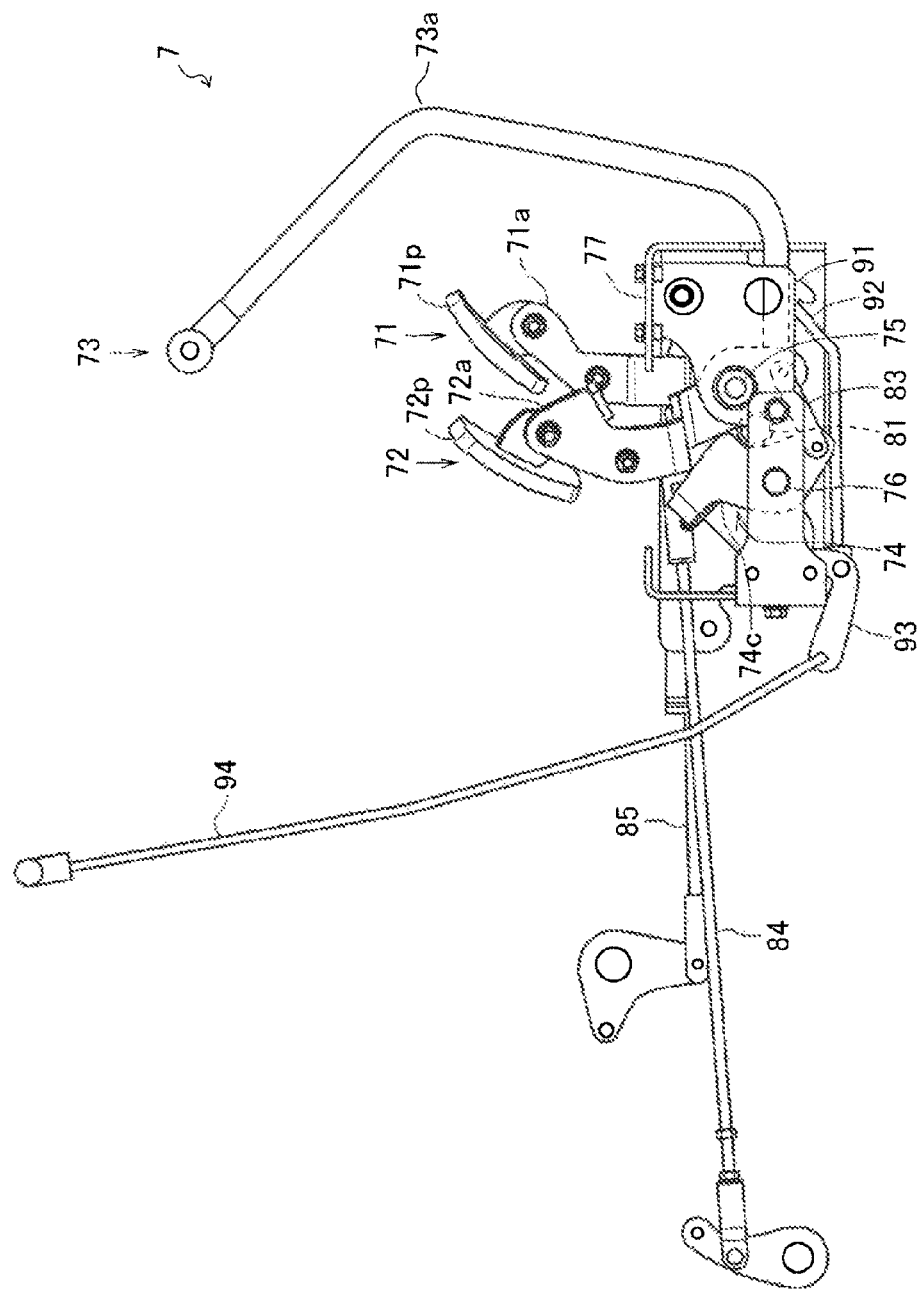
Figure 5:
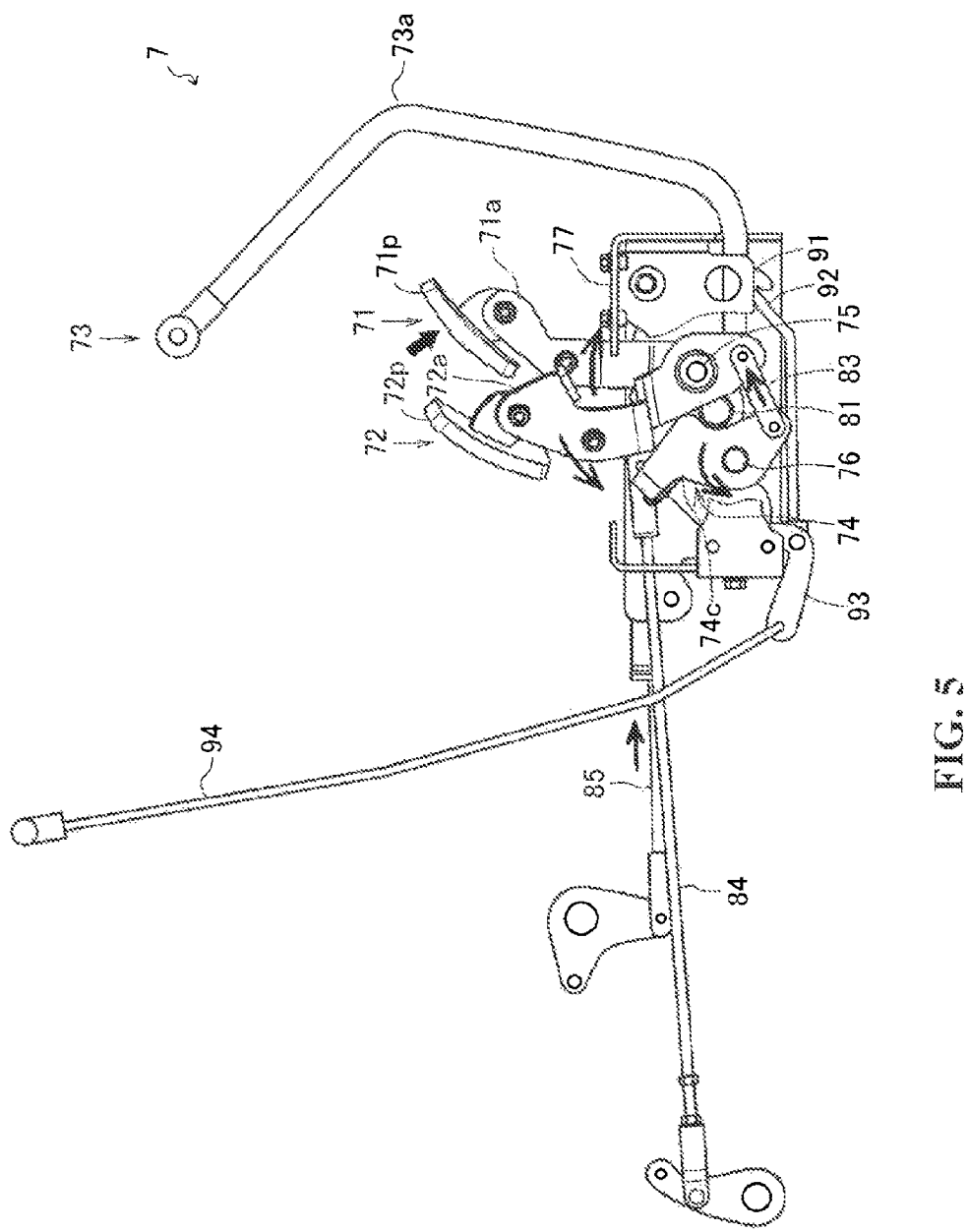
Figure 6:
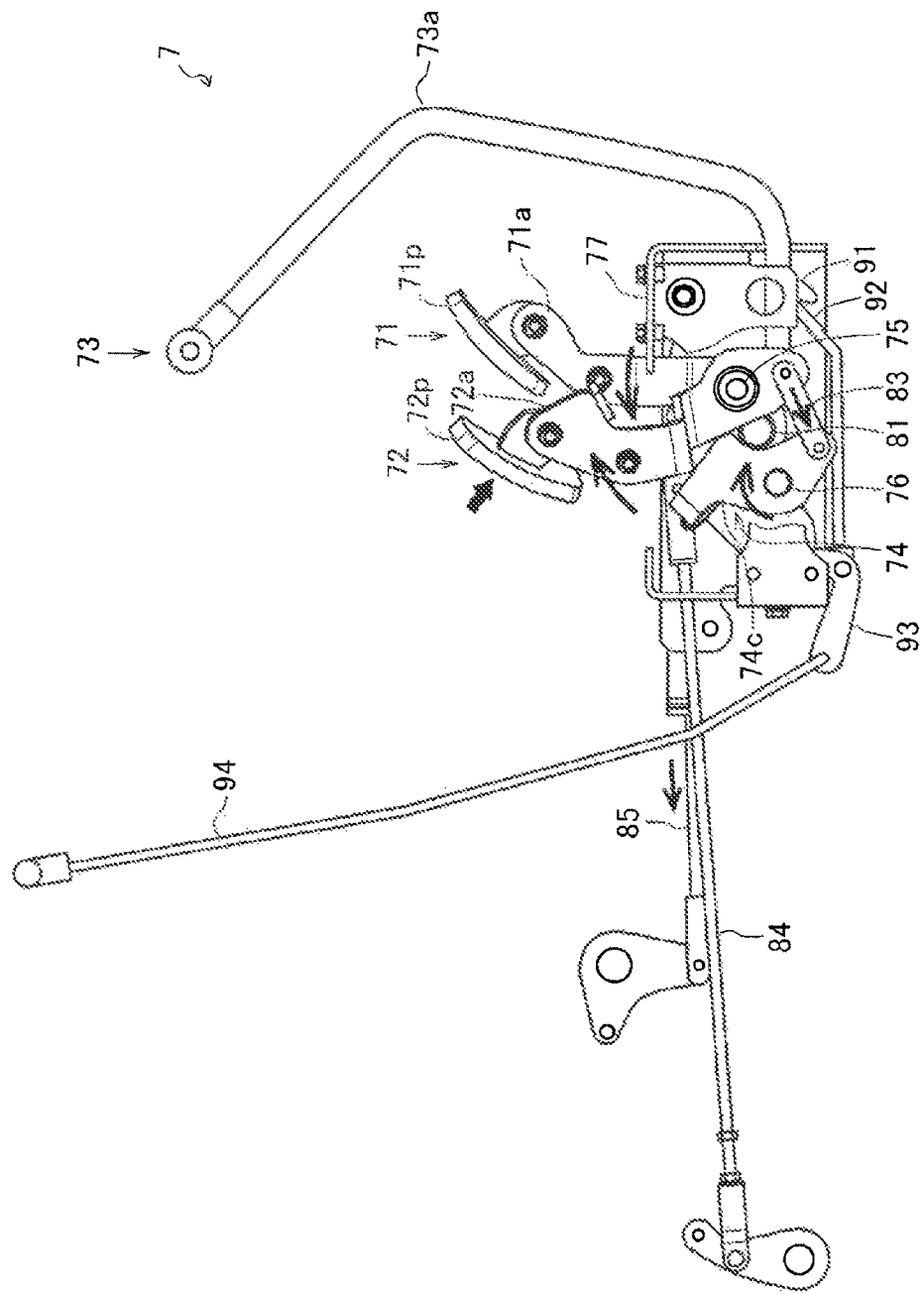
Figure 7:
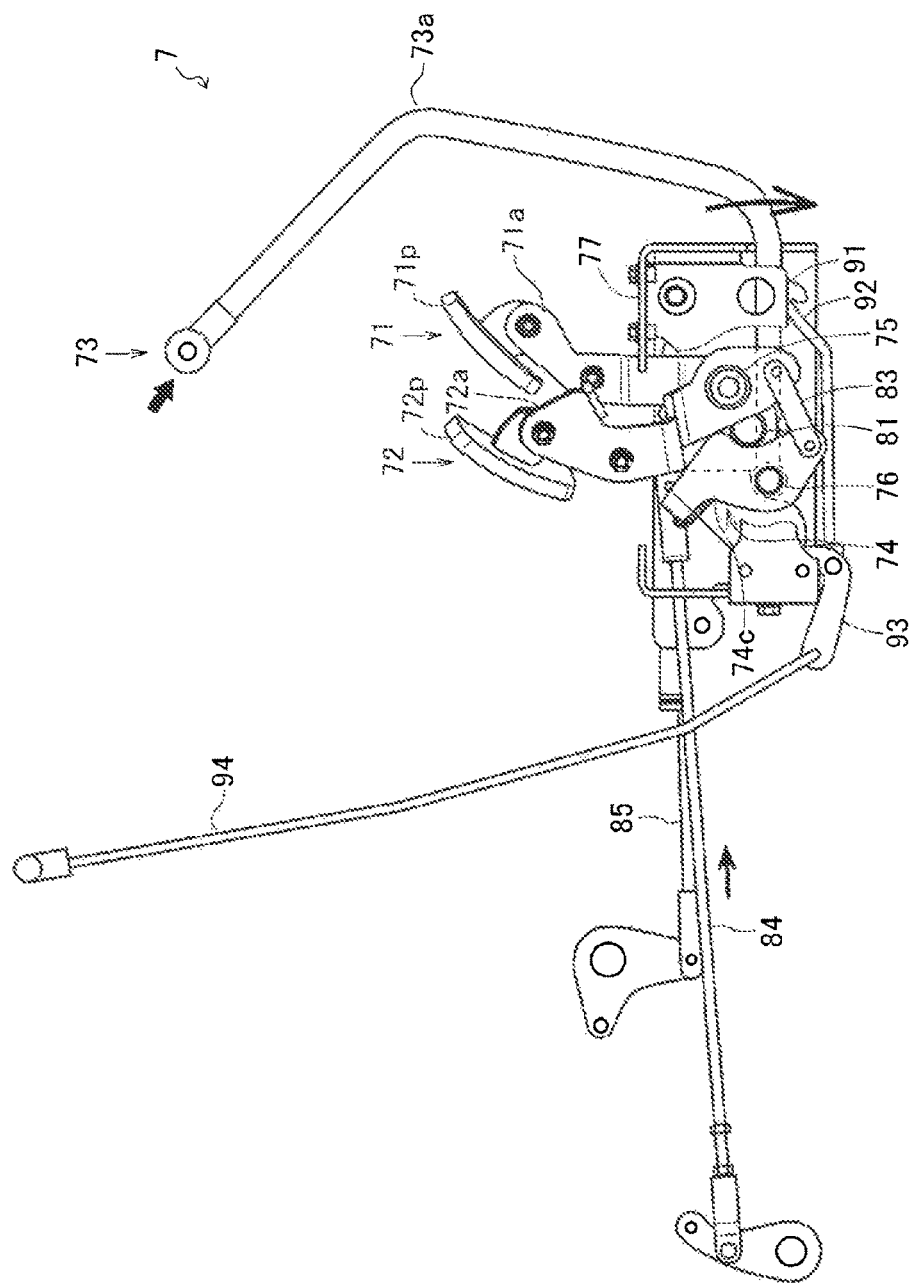
Figure 8:
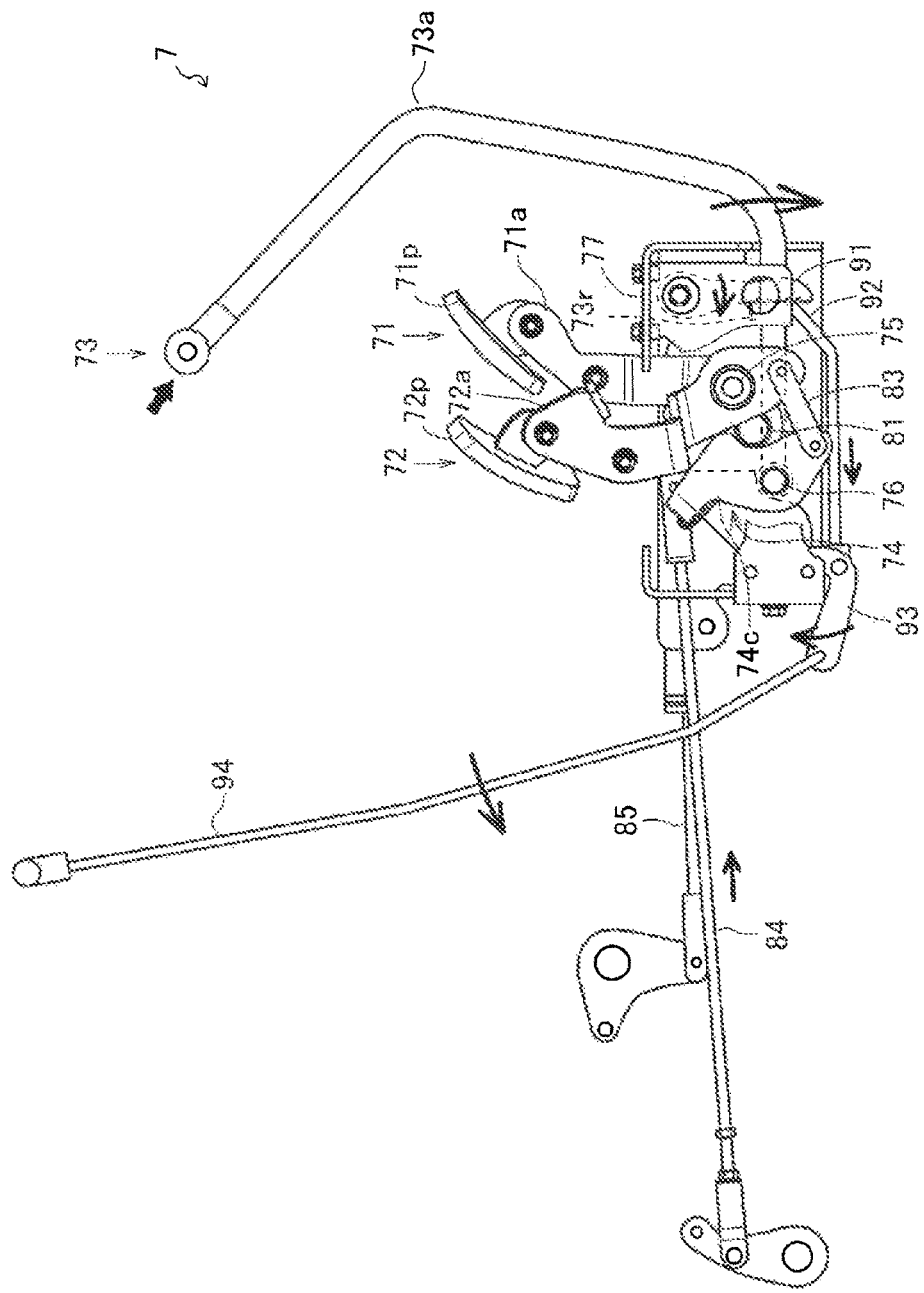

FIG. 1 is a diagram showing a tractor.
FIG. 2 is a diagram showing a pedal assembly module.
FIG. 3 is a view in a direction of an arrow Fx in FIG. 2.
FIG. 4 is a view in a direction of an arrow Fy in FIG. 2.
FIG. 5 is a diagram showing an operation mode in a case where a forward pedal is depressed.
FIG. 6 is a diagram showing an operation mode in a case where a backward pedal is depressed.
FIG. 7 is a diagram showing an operation mode in a case where a brake pedal is depressed.
FIG. 8 is a diagram showing an operation mode of a parking brake mechanism.

DETAILED DESCRIPTION OF THE INVENTION

First, a tractor 100 is briefly described. A pedal assembly module 7 according to the present invention can be applied to vehicles other than tractors.
FIG. 1 shows the tractor 100. In the figure, the front and rear direction and the upper and lower direction of the tractor 100 are indicated.
The tractor 100 mainly includes a frame 1, an engine 2, a transmission 3, a front axle 4, and a rear axle 5. The tractor 100 also includes a cockpit 6, which accommodates an operator.
The frame 1 serves as the main structure for the tractor 100. The engine 2 and the like described below are attached to the frame 1.
The engine 2 converts energy obtained by burning a fuel into rotational movement. When the operator operates an acceleration lever, the engine 2 changes the driving state in accordance with the operation. The engine 2 maintains the rotational speed at a constant level even when the load changes.
The transmission 3 switches between forward and backward movement of the tractor 100 and shifts the speed of the tractor 100. When the operator operates a shift lever, the operation state of the transmission 3 changes in accordance with the operation. The transmission 3 includes a hydromechanical continuously variable transmission (HMT or I-HMT) as a transmission device.
The front axle 4 transmits the rotational energy from the engine 2 to front tires 41. The rotational energy from the engine 2 is input to the front axle 4 through the transmission 3. The front axle 4 is disposed next to a steering device. When the operator operates a handle, the steering device changes a steering angle of the front tires 41 in accordance with the operation.

The rear axle 5 transmits the rotational energy from the engine 2 to rear tires 51. The rotational energy from the engine 2 is input to the rear axle 5 through the transmission 3. The rear axle 5 is provided with a PTO output mechanism. The PTO output mechanism inputs the rotational energy to a towing implement.

The cockpit 6 is a control cabin of the tractor 100. The cockpit 6 is provided with an acceleration lever and a handle. The cockpit 6 is further provided with a forward pedal 71, a backward pedal 72, and a brake pedal 73. These pedals form the pedal assembly module 7.

The pedal assembly module 7 is described below.

FIG. 2 shows the pedal assembly module 7. FIG. 3 is a view in a direction of an arrow Fx in FIG. 2. FIG. 4 is a view in a direction of an arrow Fy in FIG. 2. In the figure, the front and rear direction, the left and right direction, and the upper and lower direction of the tractor 100 are indicated.

The pedal assembly module 7 includes a link plate 74, as well as the forward pedal 71, the backward pedal 72, and the brake pedal 73.

The forward pedal 71 includes an arm 71*a*, a sleeve 71*s*, and a pedal plate 71*p*. The arm 71*a* is formed by bending a single plate member. The sleeve 71*s* is welded while being inserted in a hole of the arm 71*a*. The pedal plate 71*p* is welded on an end portion of the arm 71*a*. The pedal plate 71*p* is covered by a rubber plate as a slip stopper. A pin is disposed on a side surface of the arm 71*a*. A roller 81 is attached to the pin. Another pin is disposed on a side surface of the arm 71*a*. One end of a spring 82 is attached to the pin.

The backward pedal 72 includes an arm 72*a*, a sleeve 72*s*, and a pedal plate 72*p*. The arm 72*a* is formed by bending a single plate member. The sleeve 72*s* is welded while being inserted in a hole of the arm 72*a*. The pedal plate 72*p* is welded on an end portion of the arm 72*a*. The pedal plate 72*p* is covered by a rubber plate as a slip stopper. A pin is disposed on a side surface of the arm 72*a*. One end of a connecting plate 83 is attached to the pin.

The brake pedal 73 includes an arm 73*a* and a sleeve 73*s*. The arm 73*a* is formed by bending a single rod member. The sleeve 73*s* is welded while being in contact with an end portion of the arm 73*a*. The other end of the arm 73*a* is bent in the left and right direction, whereby a pedal portion (a portion serving as a substitute of a pedal plate) is formed. The pedal portion is covered by a rubber tube as a slip stopper. A clevis is disposed on a peripheral surface of the sleeve 73*s*. A brake rod 84 is attached to the clevis.

The link plate 74 includes a cam plate 74*c* and a sleeve 74*s*. The cam plate 74*c* is cutout from a single plate member to be formed. The sleeve 74*s* is welded while being inserted in a hole of the cam plate 74*c*. The cam plate 74*c* is formed to have a predetermined curved surface (cam face) as its peripheral surface. The roller 81 described above is disposed while being in contact with the curved surface. The cam plate 74*c* is partly bent in the left and right direction, whereby a bracket portion is formed. The other end of the above-described spring 82 is attached to the bracket portion. A pin is disposed on a side surface of the cam plate 74*c*, and the other end of the connecting plate 83 is attached to the pin.

The pedal assembly module 7 further includes a first shaft 75 and a second shaft 76.

The first shaft 75 supports the forward pedal 71 and the backward pedal 72. Specifically, the forward pedal 71 and the backward pedal 72 are supported with the first shaft 75 inserted in their respective sleeves 71*s* and 72*s*. More specifically, the forward pedal 71 is fixed to the first shaft 75 by hitting a pin while the first shaft 75 is inserted in the sleeve 71*s*. The backward pedal 72 is supported by simply inserting the first shaft 75 in the sleeve 72*s*. Thus, the forward pedal 71 integrally rotates with the first shaft 75, whereas the backward pedal 72 rotates independently from the first shaft 75. One end of the first shaft 75 is provided with a clevis. A control rod 85 is attached to the clevis. The first shaft 75 has both ends supported by a frame box 77 formed by bending or welding a plate member.

The second shaft 76 supports the brake pedal 73 and the link plate 74. Specifically, the brake pedal 73 and the link plate 74 are supported with the second shaft 76 inserted in their respective sleeves 73*s* and 74*s*. More specifically, the brake pedal 73 is supported by simply inserting the second shaft 76 in the sleeve 73*s*. The link plate 74 is supported by simply inserting the second shaft 76 in the sleeve 74*s*. Thus, the brake pedal 73 and the backward pedal 72 each rotate independently from the second shaft 76. A spring is fit on to an intermediate portion of the second shaft 76. The spring biases the brake pedal 73 (arm 73*a*). The second shaft 76 has both end portions supported by the frame box 77 described above.

Next, an operation mode in a case where the forward pedal 71 is depressed will be described.

FIG. 5 shows the operation mode in the case where the forward pedal 71 is depressed. Arrows in the figure indicate operation directions of the components.

The operator depresses the forward pedal 71 to move the tractor 100 forward. Then, the forward pedal 71 rotates the first shaft 75, and the first shaft 75 pulls the control rod 85. Thus, the operation state of the continuously variable transmission is changed, whereby the tractor 100 moves forward.

Here, the link plate 74 rotates along with the rotation of the forward pedal 71. Specifically, the roller 81 moves upward along with the rotation of the forward pedal 71. Thus, the link plate 74 in contact with the roller 81 also rotates. Thus, the link plate 74 rotates the backward pedal 72 through the connecting plate 83 (rotated in a direction opposite to that in a case where the backward pedal 72 is depressed). As described above, the pedal assembly module 7 pushes out the backward pedal 72 when the forward pedal 71 is depressed.

Next, an operation mode in the case where the backward pedal 72 is depressed will be described.

FIG. 6 shows the operation mode where the backward pedal 72 is depressed. Arrows in the figure indicate operation directions of the components.

The operator depresses the backward pedal 72 to move the tractor 100 backward. Then, the backward pedal 72 rotates the link plate 74 through the connecting plate 83, and the link plate 74 rotates the forward pedal 71. Specifically, the roller 81 moves downward along with the rotation of the link plate 74. Thus, the forward pedal 71, to which the roller 81 is attached, rotates (in a direction opposite to that in the case where the forward pedal 71 is depressed). As described above, the pedal assembly module 7 pushes out the forward pedal 71 when the backward pedal 72 is depressed.

Here, the first shaft 75 rotates along with the rotation of the forward pedal 71. Thus, the first shaft 75 pushes out the control rod 85. Thus, the operation state of the continuously variable transmission is changed, whereby the tractor 100 moves backward.

Next, an operation mode in a case where the brake pedal 73 is depressed will be described.

FIG. 7 shows the operation mode in the case where the brake pedal 73 is depressed. Arrows in the figure indicate operation directions of the components.

The operator depresses the brake pedal 73 to stop the tractor 100. Then, the brake pedal 73 pulls the brake rod 84. Thus, a braking device is activated and the tractor 100 is stopped.

The pedal assembly module 7 farther includes a parking brake mechanism.

The parking brake mechanism mainly includes a ratchet plate 91 and a link rod 92.

The ratchet plate 91 is cutout from a single plate member to be formed. The ratchet plate 91 includes a plurality of claw blades arranged along the arm 73a of the brake pedal 73. The ratchet plate 91 is supported by the frame box 77 in a rotatable manner. A lock plate 73r is welded on the arm 73a. The claws are hooked on the lock plate 73r.

The link rod 92 is formed by bending a single rod member. The link rod 92 is coupled to the ratchet plate 91 having one end supported by the frame box 77. Thus, the link rod 92 can be regarded as being supported by the frame box 77. The link rod 92 has the other end coupled to the arm plate 93. A parking lever 94 is coupled to the arm plate 93.

Next, an operation mode of the parking brake mechanism will be described.

FIG. 8 shows the operation mode of the parking brake mechanism. Arrows in the figure indicate operation directions of the components.

The operator moves the parking lever 94 to a predetermined position to park the tractor 100. Thus, the parking lever 94 pulls the link rod 92 through the arm plate 93. The link rod 92 rotates the ratchet plate 91. Then, when the operator depresses the brake pedal 73, the claws of the ratchet plate 91 are hooked on the lock plate 73r. Thus, the brake pedal 73 is stopped. Thus, the braking device is kept under operation, and the tractor 100 can be parked.

The pedal assembly module 7 according to the present invention described above is summarized as follows.

The pedal assembly module 7 is formed by assembling and integrating the forward pedal 71, the backward pedal 72, and the brake pedal 73 with their functions ensured. Thus, the steps of attaching the various pedals can be omitted, and only the pedal assembly module 7 needs to be attached, whereby the productivity can be improved.

As a feature of the pedal assembly module 7, the forward pedal 71 and the backward pedal 72 are supported with the first shaft 75 inserted in their sleeves 71s and 72s. Thus, a structure for supporting the forward pedal 71 and the backward pedal 72 is simplified, whereby the cost reduction is able to be achieved.

As a feature of the pedal assembly module 7, the brake pedal 73 and the link plate 74 are supported with the second shaft 76 inserted in their sleeves 73s and 74s. Thus, a structure for supporting the brake pedal 73 and the link plate 74 is simplified, whereby the cost reduction is able to be achieved.

Furthermore, as a feature of the pedal assembly module 7, the link plate 74 forms a mechanism of pushing out the backward pedal 72 when the forward pedal 71 is depressed, and pushing out the forward pedal 71 when the backward pedal 72 is depressed. Thus, the forward pedal 71 and the backward pedal 72 are interlocked, and the clutch is not needed. Thus, the cost reduction is able to be achieved.

Still furthermore, as a feature of the pedal assembly module 7, the ratchet plate 91 and the link rod 92 are supported by the frame box 77. Thus, the steps for attaching the ratchet plate 91 and the link rod 92 are able to be omitted, whereby the productivity is able to be further improved.

What is claimed is:

1. A pedal assembly module comprising;
   a forward pedal;
   a backward pedal;
   a first shaft supporting the forward pedal and the backward pedal;
   a brake pedal having a brake pedal sleeve;
   a second shaft supporting the brake pedal;
   a frame box supporting the first shaft and the second shaft;
   a roller attached to any one of the forward pedal or the backward pedal; and
   a link plate, having a link plate sleeve, attached to the other of the forward pedal or the backward pedal,
   wherein with the roller moving along a curved surface of the link plate, the backward pedal is pushed out by depressing the forward pedal and the forward pedal is pushed out by depressing the backward pedal,
   wherein the brake pedal rotates independently of the second shaft in a state where the second shaft is inserted into the brake pedal sleeve, and
   wherein the link plate rotates independently of the second shaft where the second shaft is inserted into the link plate sleeve.

2. The pedal assembly module according to claim 1 wherein:
   the forward pedal includes a forward pedal sleeve, and the forward pedal integrally rotates with the first shaft in a state where the first shaft is inserted into the forward pedal sleeve;
   the backward pedal includes a backward pedal sleeve, and the backward pedal rotates independently of the first shaft in a state where the first shaft is inserted into the backward pedal sleeve.

3. The pedal assembly module according to claim 1, further comprising:
   a ratchet plate stopping the brake pedal; and
   a link rod able to rotate the ratchet plate,
   wherein the ratchet plate and the link rod are supported by the frame box.

* * * * *